United States Patent
Yang

(10) Patent No.: US 11,080,224 B2
(45) Date of Patent: Aug. 3, 2021

(54) METHOD, BASEBOARD MANAGEMENT CONTROLLER AND SYSTEM FOR ESTABLISHING A SERIAL-OVER-LAN CONNECTION

(71) Applicant: AMERICAN MEGATRENDS INTERNATIONAL, LLC, Norcross, GA (US)

(72) Inventor: Jiun-Kai Yang, Taipei (TW)

(73) Assignee: AMERICAN MEGATRENDS INTERNATIONAL, LLC, Norcross, GA (US)

( * ) Notice: Subject to any disclaimer, the term of this patent is extended or adjusted under 35 U.S.C. 154(b) by 86 days.

(21) Appl. No.: 16/552,584

(22) Filed: Aug. 27, 2019

(65) Prior Publication Data
US 2021/0064565 A1    Mar. 4, 2021

(51) Int. Cl.
*G06F 13/42* (2006.01)
*H04L 17/16* (2006.01)

(52) U.S. Cl.
CPC .......... *G06F 13/4282* (2013.01); *H04L 17/16* (2013.01)

(58) Field of Classification Search
CPC ............... G06F 13/385; G06F 13/4282; G06F 13/4027; G06F 11/3006; G06F 11/3058
See application file for complete search history.

(56) References Cited

U.S. PATENT DOCUMENTS

| | | | |
|---|---|---|---|
| 2006/0168099 A1* | 7/2006 | Diamant ............... | G06F 13/385 709/217 |
| 2007/0226377 A1* | 9/2007 | Jreij ....................... | G06F 13/385 710/8 |
| 2009/0034593 A1* | 2/2009 | Chuang ................. | H04W 72/08 375/222 |

* cited by examiner

*Primary Examiner* — Jung H Park
(74) *Attorney, Agent, or Firm* — Birch, Stewart, Kolasch & Birch LLP

(57) ABSTRACT

A method, a baseboard management controller (BMC) and a system for establishing a serial-over-LAN connection are provided. The method includes: receiving data from a server unit using the first UART at a current baud rate; detecting the current baud rate of the first UART using the BMC; configuring the baud rate of the second UART of the BMC as the current baud rate; controlling the second UART to retrieve the data from the first UART at the current baud rate using the BMC; and sending the data to a network using the BMC.

11 Claims, 10 Drawing Sheets

$65h = 0110\overbrace{0101}^{A}b$  FIG. 4B $8Eh = 1000\overbrace{1110}^{A}b$  FIG. 4C $1Eh = 0001\overbrace{1110}^{A}b$  FIG. 4D $1Fh = 0001\;1111b$  FIG. 4E

METHOD, BASEBOARD MANAGEMENT CONTROLLER AND SYSTEM FOR ESTABLISHING A SERIAL-OVER-LAN CONNECTION

FIELD OF THE INVENTION

The present invention relates to a method for realizing serial-over-LAN (SOL) and a baseboard management controller (BMC) for performing the method, and more particularly to a method and a BMC for realizing SOL with enhanced efficiency.

BACKGROUND

Intelligent Platform Management Interface (IPMI) is a set of computer interface specifications often used to manage a network of computing devices for diagnostic or maintenance purposes. An IPMI includes mainly a baseboard management controller (BMC) and other controller components. The BMC is a specialized microcontroller embedded on the motherboard of a computer and independent of the operating system thereof. In general, when a remote diagnostic or maintenance procedure is required, the Serial-over-LAN (LAN) mechanism can be requested by the remote management platform, in which the BMC, upon receiving the request, controls the serial communication between the computing device and the serial port to be redirected to the LAN via the BMC UART.

Oftentimes, manually configuring the baud rate of the BMC UART is required. The reason is that the baud rate of the system UART, i.e. the UART that receives host data, is controlled by the host, and thus may change. If the baud rate at which the BMC UART receives the host data is different from the baud rate of the system UART, error may exist in the receiving of the host data. Therefore, the efficiency of establishing the SOL connection in the prior art is low due to the need to constantly try and adjust the baud rate of the BMC UART.

SUMMARY

Accordingly, one of the objectives of the present invention is to provide a method for establishing a Serial-over-LAN (SOL) connection, and a baseboard management controller (BMC) and a system for performing the method, in which automatic SOL connection is realized upon an SOL request, thereby enhancing the efficiency in the establishment of SOL connection.

One embodiment of the present invention provides a method for establishing an SOL connection. The method comprises receiving data from a server unit using a first UART at a current baud rate; detecting the current baud rate of the first UART using a BMC; configuring the baud rate of a second UART as the current baud rate using the BMC; controlling the second UART to retrieve the data from the first UART at the current baud rate using the BMC; and sending the data to a network using the BMC.

Another embodiment of the present invention provides a BMC including a second UART, a control module and a network interface. The second UART is configured to receive data from a first UART, the first UART receiving the data from a server unit. The control module is connected to the second UART and configured to detect a current baud rate of the first UART and control the second UART to receive the data from the first UART at the current baud rate. The network interface is connected to the control module, configured to receive the data from the control module and send the data to a network.

Another embodiment of the present invention provides a system for establishing an SOL connection. The system includes a server unit and a remote control unit. The server unit has a computing module, a first UART and a BMC. The first UART is electrically connected to the computing and configured to receive data from the computing module. The BMC is connected to the computing module, and includes a second UART, a control module and a network interface. The second UART is configured to receive the data from the first UART. The control module is connected to the second UART and configured to detect a current baud rate of the first UART and control the second UART to receive the data from the first UART at the current baud rate. The network interface is connected to the control module and configured to receive the data from the control module and send the data to a network. The remote control unit is electrically connected to the BMC and configured to receive the data from the network interface through the network.

In order to further the understanding of the present disclosure, reference is made to the following detailed description illustrating the embodiments and examples of the present disclosure. The description is for illustrative purpose only and is not intended to limit the scope of the claim.

BRIEF DESCRIPTION OF THE DRAWINGS

FIG. 4B to FIG. 4E illustrate the switch unit of the sample bytes of the first set of data according to several embodiments of the present invention.

DETAILED DESCRIPTION OF EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings.

Figure 1:
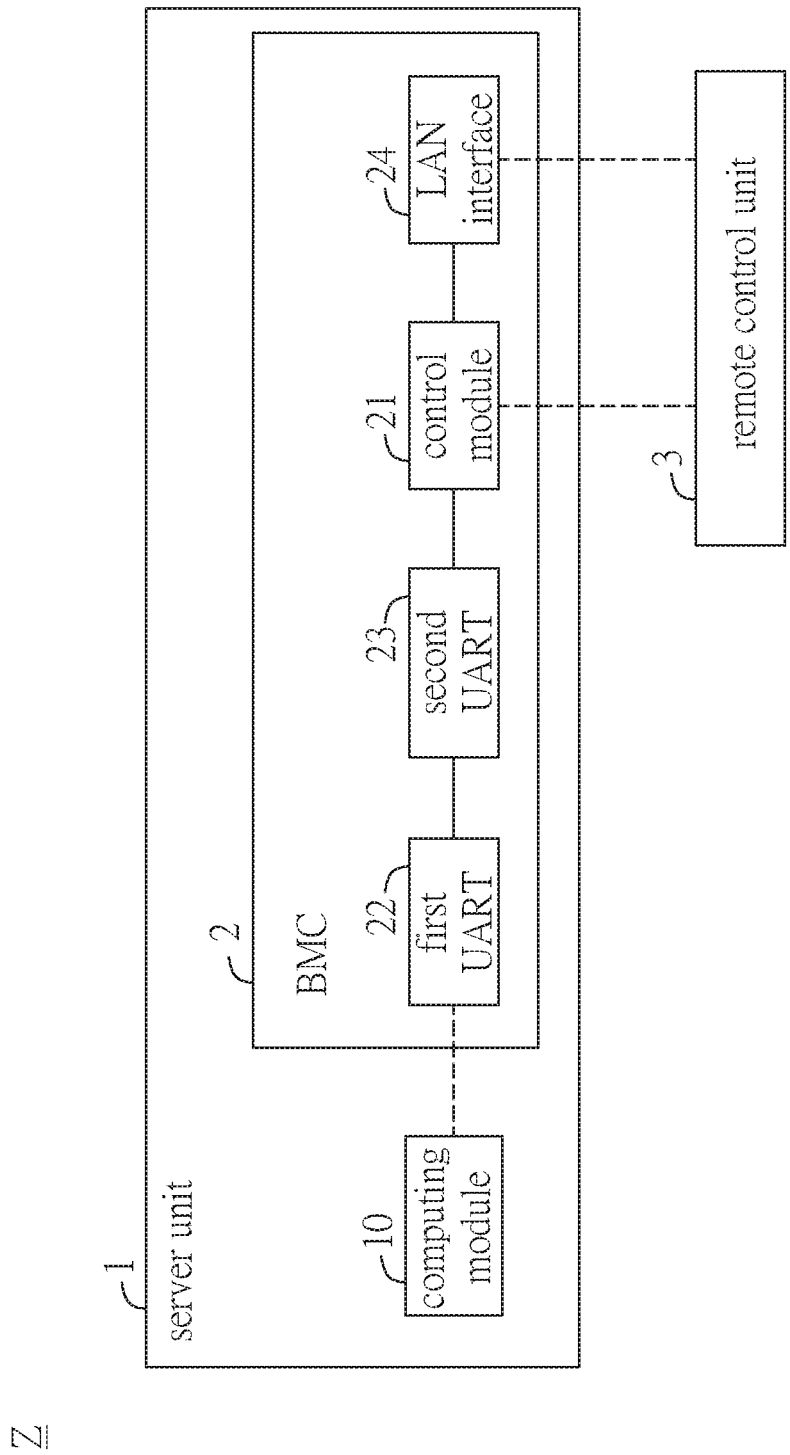
FIG. 1 shows a functional block diagram of a system for establishing an SOL connection according to one embodiment of the present invention.

Referring to FIG. 1, one embodiment of the present invention provides a system Z for establishing a Serial-over-LAN connection. The system Z includes a server unit 1 and a remote control unit 3. The server unit 1 includes a computing module 10 and a baseboard management controller (BMC) 2. Specifically, both the computing module 10 and the BMC 2 are disposed on the motherboard of the server unit 1 such that the BMC 2 serves to monitor the performance of the server unit 1 and communicates with the remote control unit 3 about the physical states of the server unit 1. The BMC 2 has a control module 21, a first UART 22, a second UART 23 and a network interface, i.e. the LAN interface 24. The first UART 22 is electrically connected to the computing module 10 and configured to receive data from the computing module 10. In this embodiment, the first UART 22 is disposed on the BMC chip; however, the present invention is not limited thereto. In other embodiments, the first UART 22 can be disposed on the computing module 10. The control module 21 is connected between the second UART 23 and the LAN interface 24, and configured to detect the current baud rate of the first UART 22, control the second UART 23 to receive the data from the first UART 22 at the current baud rate, and send the data to a network through the LAN interface 24.

Figure 2:
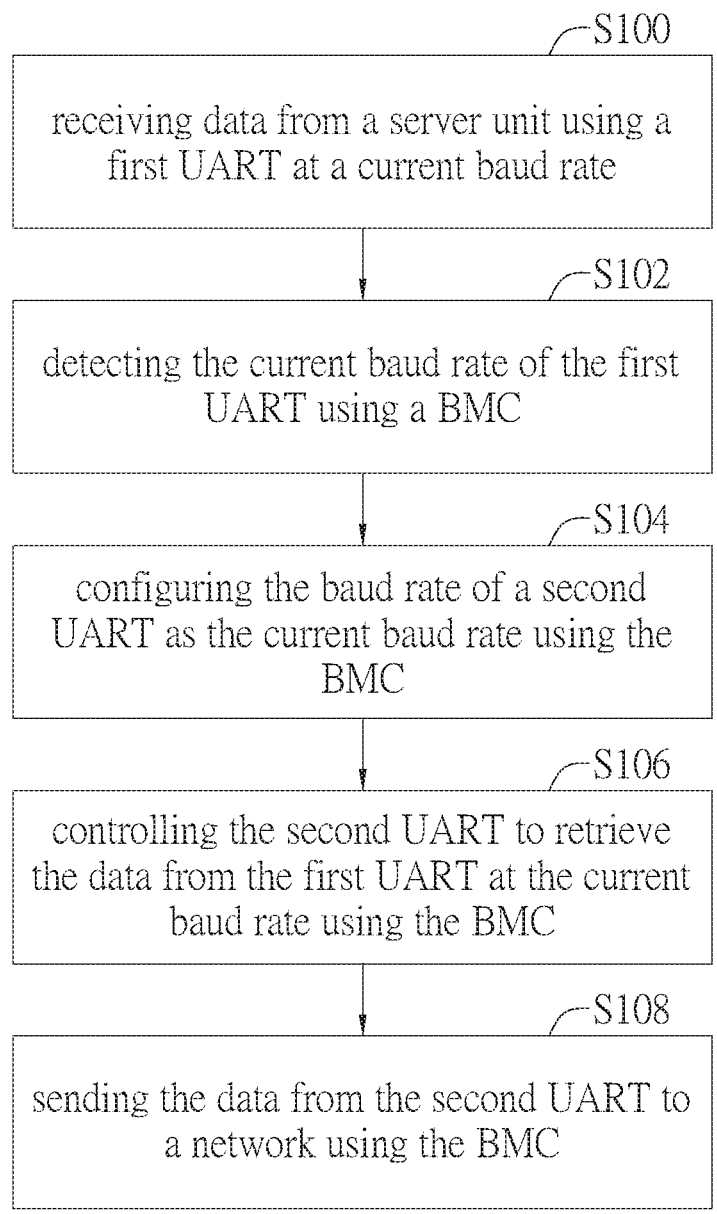
FIG. 2 shows a flow chart illustrating a method for establishing an SOL connection according to one embodiment of the present invention.

The system Z shown in FIG. 1 is used for performing the method provided in FIG. 2. With reference to both FIG. 1 and FIG. 2, when the remote control unit 3 requests an SOL connection, the system Z performs the following steps. Step S100: receiving data from a server unit 1 using the first UART 22 at a current baud rate; step S102: detecting the current baud rate of the first UART 22 using the BMC 2; step S104: configuring the baud rate of the second UART 23 as the current baud rate using the BMC 2; step S106: controlling the second UART 23 to retrieve the data from the first UART 22 at the current baud rate using the BMC; and step 108: sending the data to a network using the BMC 2.

More specifically, the control module 21 is programmed to perform steps S102 to step S108, in which the control module 21 detects the current baud rate of the first UART 22 in step S102, configures the baud rate of the second UART 23 to be the current baud rate of the first UART 22 in step S104, controls the second UART 23 to receive the data from the first UART 22 in step S106, and sends the data to the network through the LAN interface 24 in step S108.

With the technical solution described above, the BMC 2 can perform accurate and efficient SOL connection by automatically detecting the current baud rate of the first UART 22 before controlling the second UART 23 to receive the data from the first UART 22 at the same baud rate and sending the data to the network.

Figure 3:
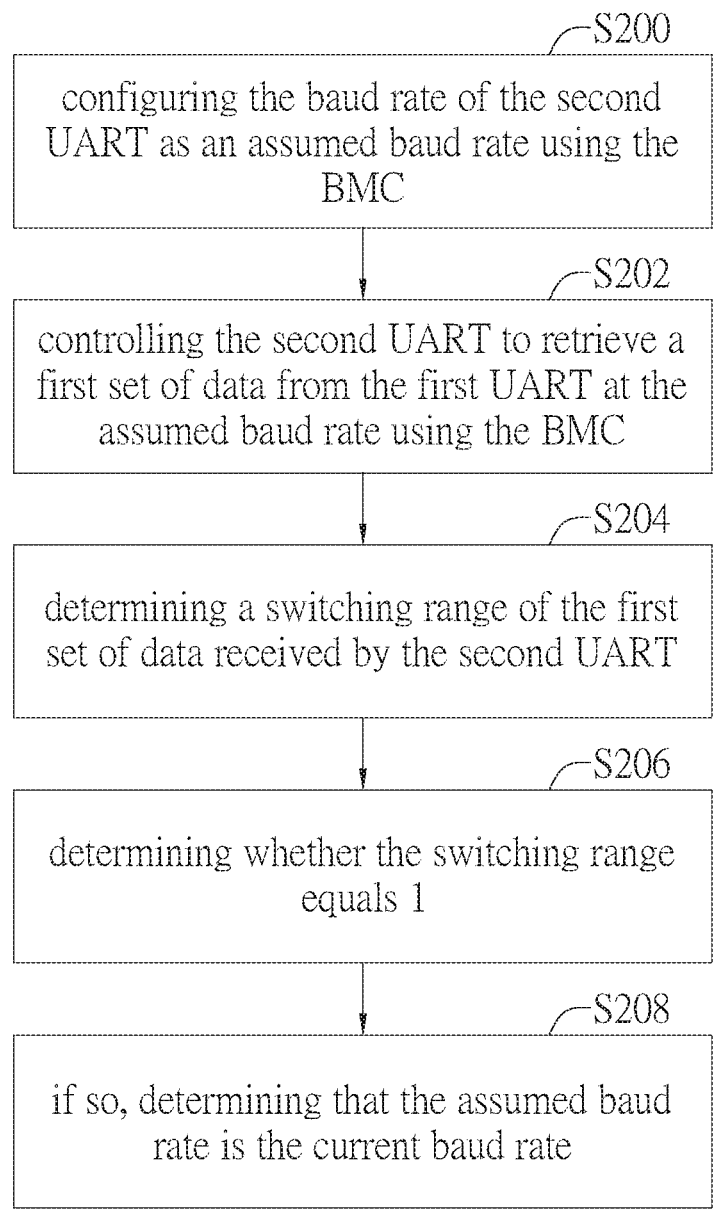
FIG. 3 shows a flow chart illustrating a method for detecting the current baud rate of the first UART according to one embodiment of the present invention.

The present invention is not limited by the way the BMC 2 detects the current baud rate of the first UART 22. Referring to FIG. 3, in one embodiment, step S102 can be completed by performing the following step S200: configuring the baud rate of the second UART as an assumed baud rate using the BMC; step S202: controlling the second UART 23 to retrieve a first set of data from the first UART 22 at the assumed baud rate using the BMC; step S204: determining a switching range of the data received by the second UART; step S206: determining whether the switching range of the first set of data equals 1; and step S208: if so, determining that the assumed baud rate is the current baud rate.

Figure 4A:
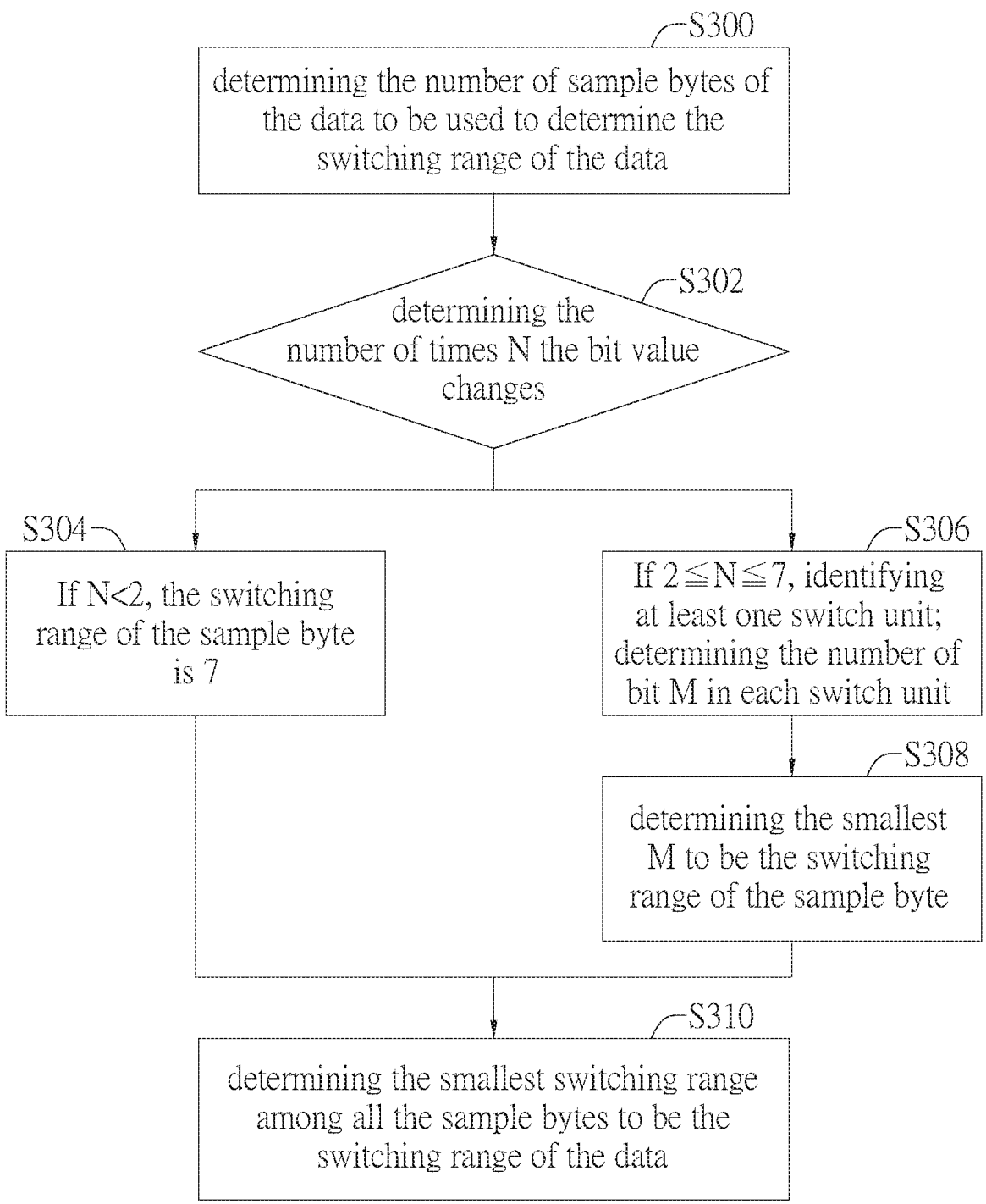
FIG. 4A shows a flow chart illustrating a method of determining the switching range of the first set of data according to one embodiment of the present invention.

In the method stated above, by setting an assumed baud rate for the second UART 23, and scanning the data received from the first UART 22 at the assumed baud rate to determine whether the data is received correctly, the present embodiment can detect the current baud rate of the first UART 22. More specifically, referring to FIG. 4A, step S204 of FIG. 3 further includes step S300: determining the number of sample bytes of the first set of data to be used to determine the switching range of the first set of data; step S302: determining the number of times N the bit value changes within each sample byte. In the present embodiment, the number N can be determined either by scanning bits from the most significant bit (MSB) to the least significant bit (LSB) or from the LSB to the MSB.

When the number N for one sample byte is smaller than 2, the control module 21 sets the switching range of the sample byte to be an integer equal to or higher than 7 (step S304). In the embodiment shown in FIG. 4A, the switching range is set to be 7; however, the present invention is not limited thereto. When the number N for the sample byte is greater than or equal to 2 or less than or equal to 7, the control module 21 identifies within the sample byte at least one switch unit, in which each switch unit has at least one bit, and each bit has the same bit value that is different from the bit value assigning to the bit positions on either side of the switch unit. Afterwards, the number of bits M within each switch unit is determined (step S306). Furthermore, for a sample byte having only one switch unit, the number M is the switching range of the sample byte; for a sample byte having more than one switch unit, the smallest number M is determined to be the switching range of the sample byte (step S308).

Please refer to FIG. 4B to FIG. 4E while step S304, step S306 and step S308 are further described. When N is more than or equal to 2 or less than or equal to 7, it means that the bit value is changed at least twice from the MSB to the LSB within a sample byte. Therefore, at least one switch unit A can be identified within the sample byte, in which each switch unit has at least one bit with a bit value different from that assigning to its adjacent bit positions. Taking the sample byte in FIG. 4B for example, the number N is 4, which indicates that the bit value has been changed from 0 to 1 or from 1 to 0 and changed back twice, and therefore two switch units A can be found in this sample byte. For the switch unit A on the left, the number of bits M is 2, and for the switch unit A on the right, the number of bits M is 1. According to step S308, the number 1 is determined to be the switching range of the sample byte 65h. Similarly, the number 4 for the sample byte 8Eh shown in FIG. 4C is 4, the number of bits for each switch unit A therein is 3, and thus the switching range of the sample byte 8Eh is 3. In FIG. 4D, the number N is for the byte 1Eh is 2, the number of bits for the switch unit A is 4, and thus the switching range of the byte 1Eh is 4. In FIG. 4E, since the number N is 1, which means that the bit value changes only once throughout the sample byte 1Fh, no switch unit is formed. According to step S304, the switching range for the sample byte 1Fh is 7. The purpose of setting an integer equal to or higher than 7 in step S304 is to indicate that since a switch unit is not formed within the sample byte, the sample byte is not reliable to be used to determine the baud rate. Therefore, the integer can be any other number greater than 7.

Regarding step S300, the present invention is not limited by the number of sample bytes determined. A person skilled in the art can choose according to actual applications. After the switching range for each sample byte is determined, the smallest switching range among which is determined to be the switching range of the data (step S310). For example, if the number of sample bytes is determined to be 4, and the four sample bytes 65*h*. 8Eh, 1Eh, 1Fh in FIG. 4B to FIG. 4E are successive and to be used to determine the switching range of a data stream, since the switching range for each of these sample bytes is 1, 3, 4, and 7 respectively, the smallest number 1 is chosen to be the switching range of the data stream.

Figure 5:
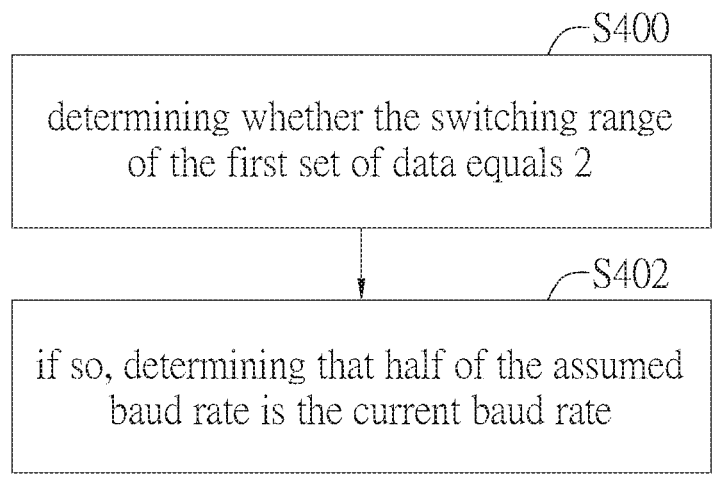
FIG. 5 illustrates one embodiment of the step of detecting the current baud rate of the first UART according to the present invention.
Figure 6:
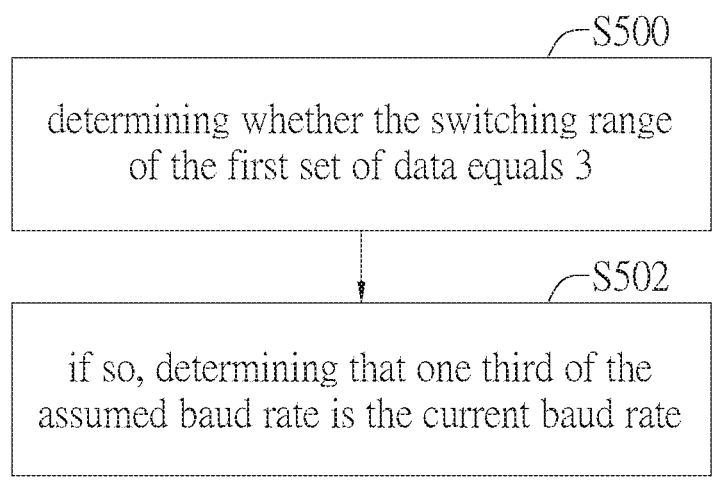
FIG. 6 illustrates one embodiment of detecting the current baud rate of the first UART according to the present invention.

Referring back to FIG. 3, after the switching range of the data received by the second UART 23 is determined, the control module 21 further determines whether the switching range equals 1. Since the number M, i.e. the number of bits within a switch unit, should be proportional to the rate at which the UART receives serial data, if the switching range is 1, the assumed baud rate is determined to be the current baud rate of the first UART 22. Similarly, with reference to FIG. 5 and FIG. 6, when the switching range of the data equals 2 or 3, the baud rate of the first UART 22 can be determined to be half of the assumed baud rate, or one third of the assumed baud rate, respectively. Furthermore, in one embodiment, the method of FIG. 4 can further include step S400: determining whether the switching range of the first set of data equals 2, and step S402: if so, determining that half of the assumed baud rate is the current baud rate. Step S400 can be performed before step S206, and if the switching range is not 2, the control module 21 performs step S206. In another embodiment, step S206 can be performed after step S206 and the switching range does not equal 1. Moreover, in one embodiment, the method of FIG. 4 can include step S500: determining whether the switching range of the first set of data equals 3; and step S502: if so, determining that one third of the assumed baud rate is the current baud rate. It should be noted that the present invention is not limited by the order of performing step S206, step 400 and step S500. For instance, step S500 can be performed after step 206 and/or step 400, that is, when it is determined that the switching range does not equal either 2 or 3, or step S500 can be performed right after the switching range is determined in step S204.

Figure 7:
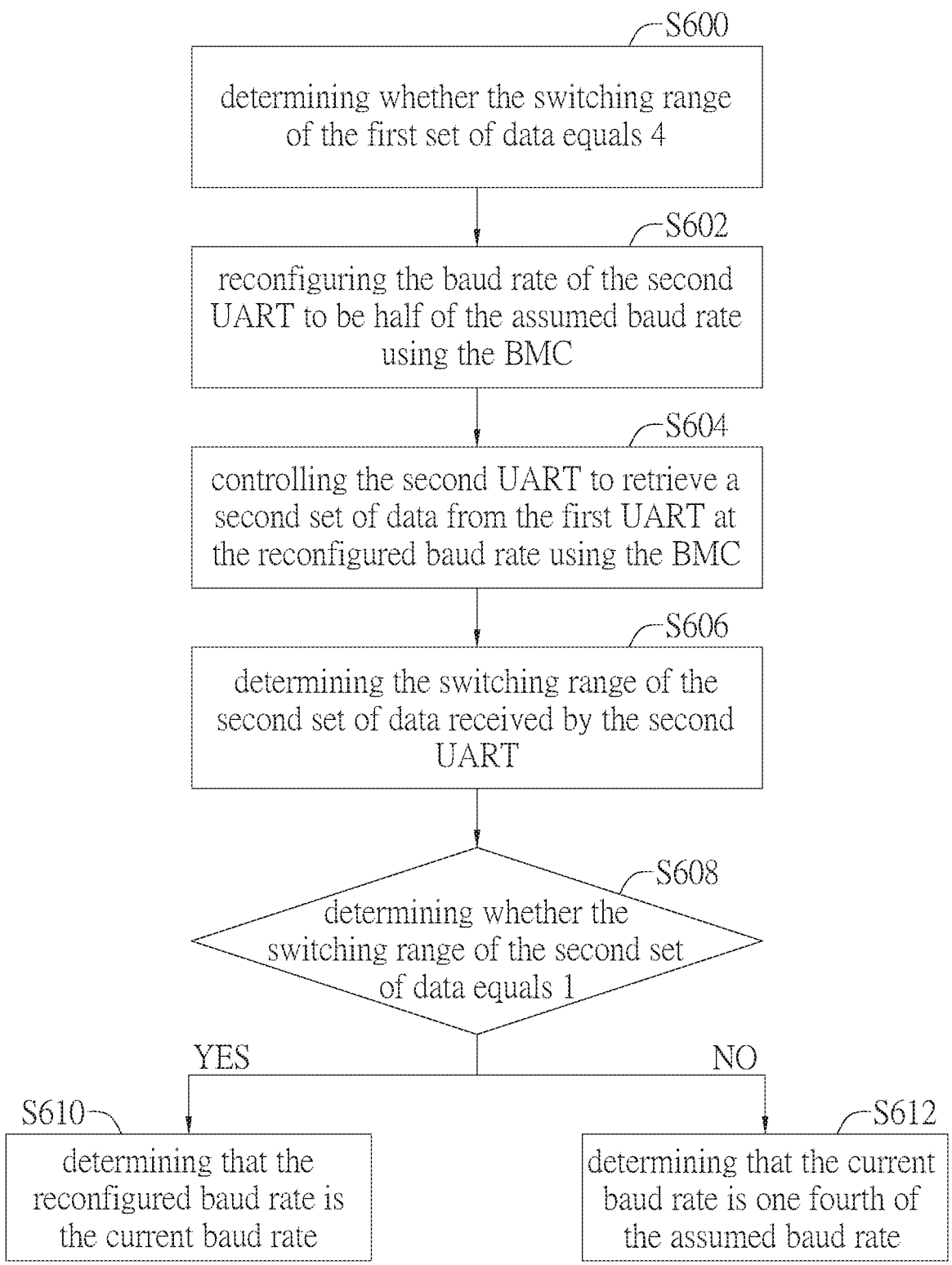
FIG. 7 illustrates one embodiment of detecting the current baud rate of the first UART according to the present invention.

Referring to FIG. 7, in one embodiment wherein it is determined that the switching range equals 4, the current baud rate of the first UART 22 can be half of or one fourth of the assumed baud rate. Therefore, in one embodiment, the method of FIG. 3 can further include S600: determining whether the switching range of the first set of data equals 4; step S602: if so, reconfiguring the baud rate of the second UART to be half of the assumed baud rate using the BMC; step S604: controlling the second UART to retrieve a second set of data from the first UART at the reconfigured baud rate using the BMC; step S606: determining the switching range of the second set of data received by the second UART; step S608: determining whether the switching range of the second set of data equals 1. In the case where the current baud rate equals half of the assumed baud rate, the switching range determined by step S608 will be 1, and the current baud rate is determined to be the reconfigured baud rate, i.e. half of the assumed baud rate (step S610). In the other case where the current baud rate is one fourth of the assumed baud rate, the switching range determined by step S608 will be 2. Therefore, the current baud rate can be determined to be one fourth of the assumed baud rate (step S612). It should be noted that step S600 can be performed before or after either one of step S206, step 400, and step 500.

Figure 8:
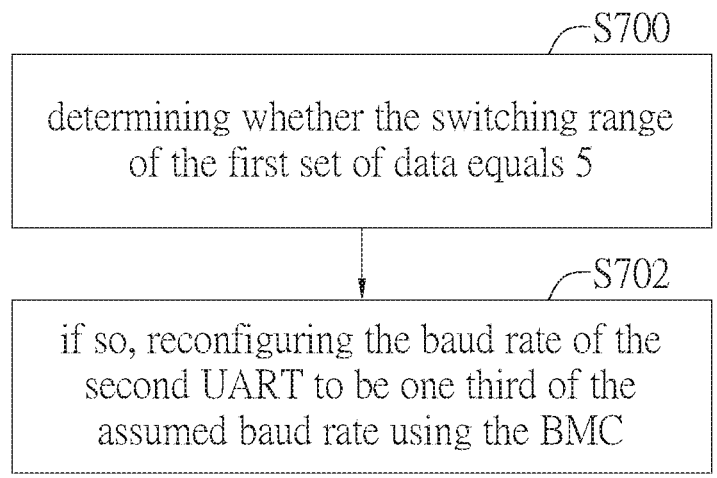
FIG. 8 illustrates one embodiment of detecting the current baud rate of the first UART according to the present invention.
Figure 9:
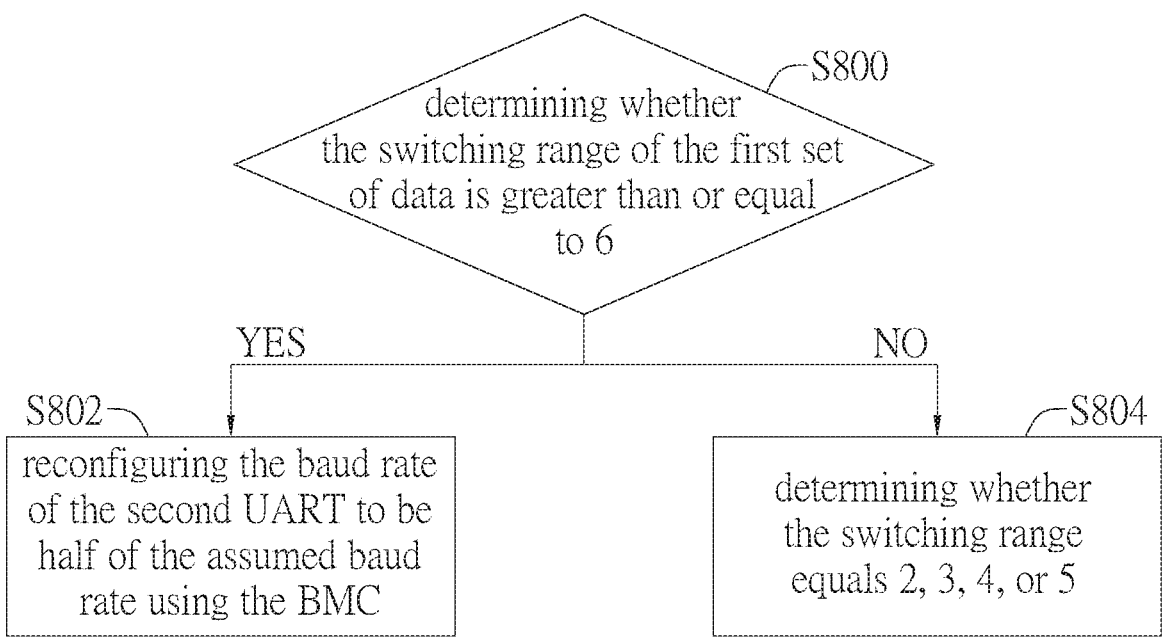
FIG. 9 illustrates one embodiment of detecting the current baud rate of the first UART according to the present invention.

Referring to FIG. 8 and FIG. 9, since larger switching ranges, such as 5 and 6, would result in incorrect configuration of baud rate according to experimental results, in one embodiment wherein the switching range of the first set of data is determined to be 5 (step S700), the baud rate of the second UART 23 is reconfigured to be one third of the assumed baud rate (step S702), and in one embodiment wherein the switching range of the first set of data is determined to be equal to or greater than 6 (step S800), the baud rate of the second UART 23 is reconfigured to be half of the assumed baud rate (step S802). In some embodiments, after the reconfiguration of the assumed baud rate, the control module 21 may control the second UART 23 to receive data from the first UART 22 at the reconfigured baud rate, and determine the switching range based on the reconfigured baud rate. If it is determined that the switching range is not greater than or equal to 6 in step S800, then the control module 21 proceeds to determine whether the switching range equals other possible integers smaller than 6 (step S804).

It should be noted that step S700 and step S800 can be performed before or after step S206, step S400, step S500 and step S600. In one embodiment, step S800 can be performed before all said other steps so as to narrow down the possible switching range values and the efficiency of building the SOL connection can be increased, e.g. as in the embodiment of FIG. 10; however, the present invention is not limited thereto.

Figure 10:
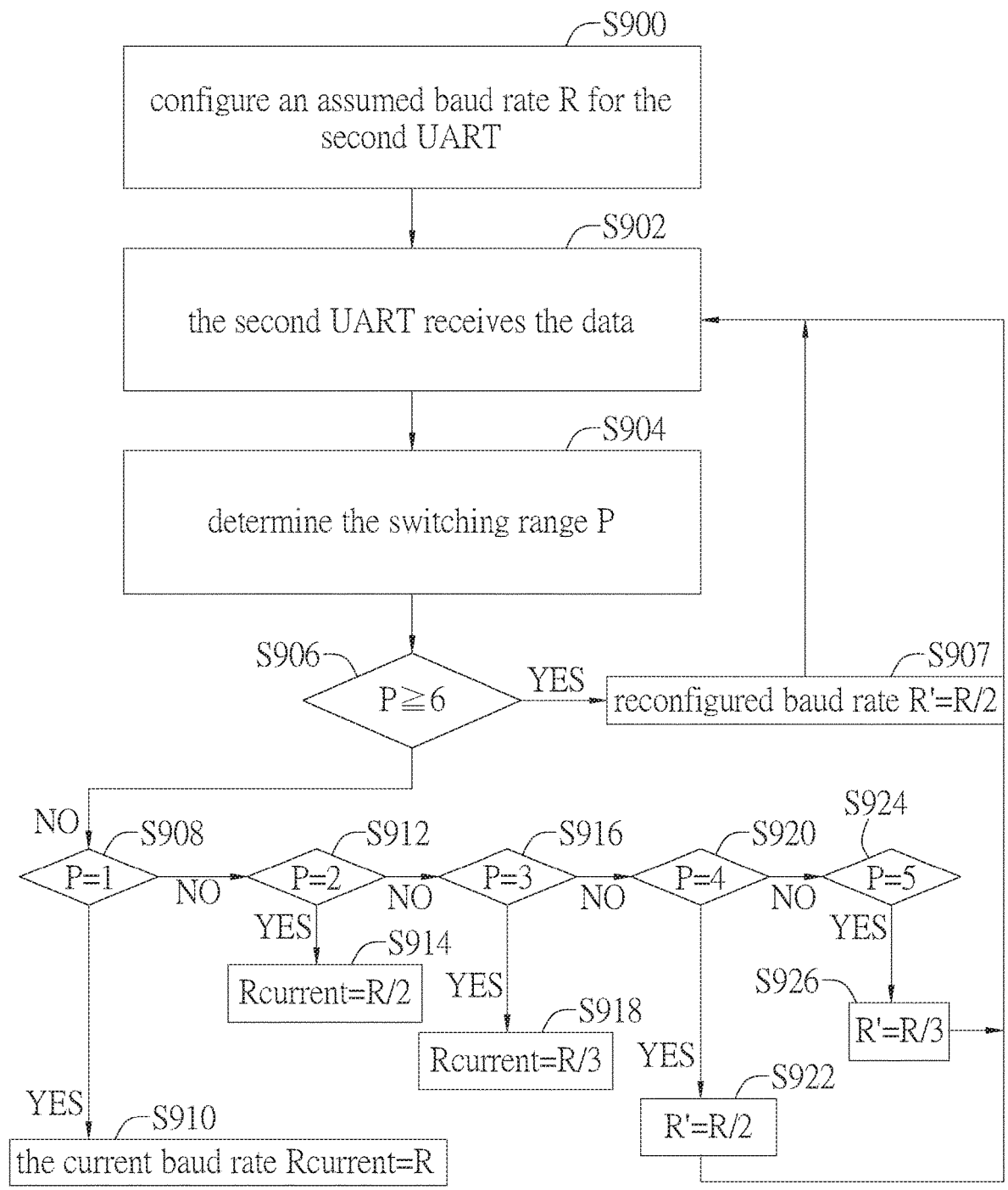
FIG. 10 illustrates one embodiment of determining the current baud rate of the first UART according to the present invention.

Referring to FIG. 10, in one embodiment, the method for detecting the current baud rate of the first UART 22 when establishing an SOL connection according to the present invention can include step S900: the control module 21 configuring an assumed baud rate for the second UART 23; step S902: the second UART 23 receiving data from the first UART 22 at the assumed baud rate; step S904: the control module 21 determining the switching range P of the data received in step S902; step S906: determining whether the switching range is more than or equal to 6. If so, reconfiguring the baud rate for the second UART 23 to be half of the assumed baud rate (step S907) according to step S802, and then repeating steps S902 through step S906. If not, determining whether the switching range equals 1 (step S908), 2 (step S912), 3 (step S916), 4 (step S920) or 5 (step S924), which can be done in any order in other embodiments, and is not limited to the order shown in FIG. 10.

For example, in the embodiment shown in FIG. 10, step S908 is firstly performed, but the present invention is not limited thereto. The performance of step S908 leads to either the determination that the current baud rate equals the assumed baud rate (step S910) according to the method in FIG. 3, or the subsequent performance of step S912. Step S912 then results in either the determination that the current baud rate equals half of the assumed baud rate (S914) according to the method in FIG. 5, or the performance of step S916, which in turn leads to either step S918 or step S920. The remaining steps shown in FIG. 10 are performed based on the embodiments of FIG. 7 and FIG. 8; hence will not be described again for the purpose of conciseness.

It should be noted that in the embodiments mentioned above, the current baud rate of the first UART 22 is determined when it is determined that the switching range equals 1, 2, or 3. However, the present invention is not limited thereto. In one embodiment, as long as the switching range does not equal 1, the control module 21 repeats reconfiguring the baud rate of the second UART 23 until at last the switching range equals 1. For example, in a varied embodiment of FIG. 10, after performing step S912 and it is determined that the switching range P equals 2, the control module 21 reconfigures the baud rate of the second HART 23 to be half of the assumed baud rate and then repeats step S902 through step S908 in order to reduce the error rate.

Figure 11:
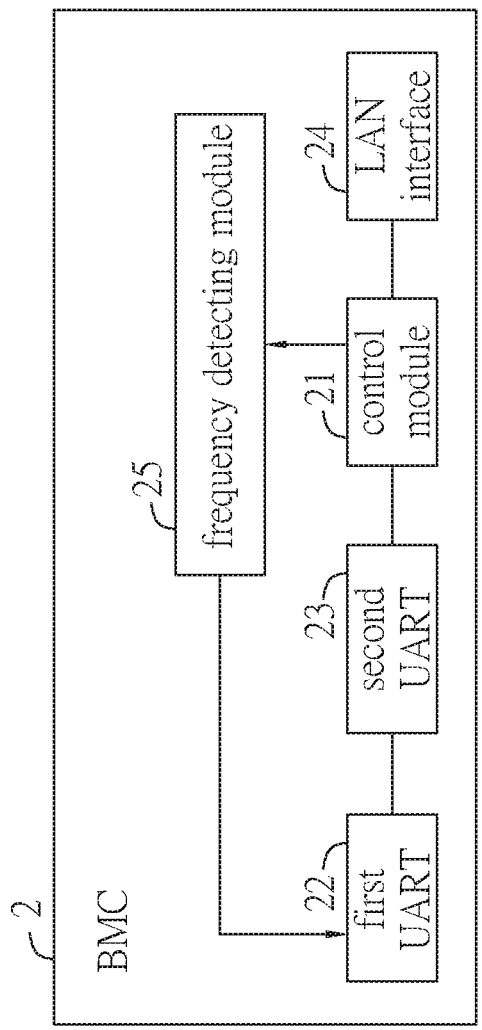
FIG. 11 shows a functional block diagram illustrating the BMC according to a varied embodiment of the present invention.

The above embodiments describe how the control module 21 realizes automatic detection of the current baud rate of the first UART 22 in step S102 with the BMC 2 structure shown in FIG. 1. However, the present invention is not limited thereto. In a varied embodiment, referring to FIG. 11, the BMC 2 can further include a frequency detecting module 25 connected between the control module 21 and the first UART 22. In this embodiment, the control module 21 controls the frequency detecting module 25 to detect the current baud rate of the first UART 22 in step S102. Detecting the baud rate using a frequency detecting component is a well-known technique in the art, and thus further details will not be described herein.

In summary, the embodiments of the present invention provide a method, a BMC and a system for establishing an SOL connection, wherein by using a BMC that is able to detect the current baud rate of the first UART automatically, the efficiency in establishing the SOL connection is enhanced, thereby dispensing with manually configuring the baud rate for the second UART.

The descriptions illustrated supra set forth simply the embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A method for establishing a Serial-over-LAN (SOL) connection, comprising:
   receiving data from a server unit using a first UART at a current baud rate;
   detecting the current baud rate of the first UART using a baseboard management controller (BMC);
   configuring the baud rate of a second UART as the current baud rate using the BMC;
   controlling the second UART to retrieve data from the first UART at the current baud rate using the BMC; and
   sending the data to a network using the BMC,
   wherein the step of detecting the current baud rate of the first UART using the BMC includes:
   configuring the baud rate of the second UART as an assumed baud rate using the BMC;
   controlling the second UART to retrieve a first set of data from the first UART at the assumed baud rate using the BMC;
   determining a switching range of the first set of data received by the second UART;
   determining whether the switching range of the first set of data equals 1; and
   if so, determining that the assumed baud rate is the current baud rate.

2. The method according to claim 1, wherein the step of determining the switching range of the first set of data received by the second UART includes:
   determining the number of sample bytes of the first set of data, wherein the sample bytes are used to determine the switching range of the first set of data;
   determining the number of times N the bit value changes between the most significant bit (MSB) and the least significant bit (LSB) within each sample byte;
   if N is smaller than 2, setting the switching range of the sample byte to be an integer equal to or higher than 7;
   if N is more than or equal to 2 or less than or equal to 7, identifying within the sample byte at least one switch unit having at least one bit, in which each bit having the same bit value that is different from the bit value assigning to the bit positions on either side of the switch unit, and determining the number of bits M within each switch unit;
   determining the smallest number M to be the switching range of the sample byte; and
   determining the smallest switching range among the switching ranges of all the sample bytes to be the switching range of the first set of data.

3. The method according to claim 1, wherein the step of detecting the current baud rate of the first UART using the BMC further comprises:
   determining whether the switching range of the first set of data equals 2; and
   if so, determining that half of the assumed baud rate is the current baud rate.

4. The method according to claim 1, wherein the step of detecting the current baud rate of the first UART using the BMC further comprises:
   determining whether the switching range of the first set of data equals 2;
   if so, reconfiguring the baud rate of the second UART to be half of the assumed baud rate;
   controlling the second UART to retrieve a second set of data from the first UART at the reconfigured baud rate using the BMC;
   determining the switching range of the second set of data received by the second UART;
   determining whether the switching range of the second set of data equals 1; and
   if so, determining that the reconfigured baud rate is the current baud rate.

5. The method according to claim 1, wherein the step of detecting the current baud rate of the first UART using the BMC further comprises:
   determining whether the switching range of the first set of data equals 3; and
   if so, determining that one third of the assumed baud rate is the current baud rate.

6. The method according to claim 1, wherein the step of detecting the current baud rate of the first UART using the BMC further comprises:
   determining whether the switching range of the first set of data equals 4;
   if so, reconfiguring the baud rate of the second UART to be half of the assumed baud rate using the BMC;
   controlling the second UART to retrieve a second set of data from the first UART at the reconfigured baud rate using the BMC;
   determining the switching range of the second set of data received by the second UART;
   determining whether the switching range of the second set of equals 1; and
   if so, determining that the reconfigured baud rate is the current baud rate, and if not, determining that the current baud rate is one fourth of the assumed baud rate.

7. The method according to claim 1, wherein the step of detecting the current baud rate of the first UART using the BMC further comprises:
   determining whether the switching range of the first set of data equals 5; and if so, reconfiguring the baud rate of the second UART to be one third of the assumed baud rate using the BMC.

8. The method according to claim 1, wherein the step of detecting the current baud rate of the first UART using the BMC further comprises:
   determining whether the switching range of the first set of data is greater than or equal to 6;
   if so, reconfiguring the baud rate of the second UART to be half of the assumed baud rate using the BMC; and
   if not, determining whether the switching range of the first set of data equals to 2, 3, 4, or 5.

9. A baseboard management controller (BMC), comprising:
   a second UART configured to receive data from a first UART, the first UART receiving the data from a server unit;
   a control module connected to the second UART and configured to detect a current baud rate of the first UART and control the second UART to receive the data from the first UART at the current baud rate, wherein the control module is configured to perform the method as claimed in claim 1; and
   a network interface connected to the control module, configured to receive the data from the control module and send the data to a network.

10. The BMC according to claim 9, further comprising:
   a frequency detecting module connected to the control module, wherein the control unit is configured to control the frequency detecting module to detect the current baud rate of the first UART.

11. A system for establishing a Serial-over-LAN connection, comprising:
   a server unit, including:
      a computing module;
      a first UART, electrically connected to the computing module and configured to receive data from the computing module; and
      a baseboard management controller (BMC) connected to the computing module, the BMC including:
         a second UART configured to receive the data from the first UART;
         a control module connected to the second UART and configured to detect a current baud rate of the first UART and control the second UART to receive the data from the first UART at the current baud rate, wherein the control module is configured to detect the current baud rate of the first UART according the method as claimed in claim 1; and
         a network interface connected to the control module, configured to receive the data from the control module and send the data to a network, and
   a remote control unit, electrically connected to the BMC and configured to receive the data from the network interface through the network.

* * * * *